United States Patent [19]
Yuan

[11] Patent Number: 5,868,158
[45] Date of Patent: Feb. 9, 1999

[54] DEVICE FOR PREVENTING DEFORMATION OF AN INFLATING VALVE DISPOSED ON AN INFLATABLE ARTICLE

[75] Inventor: Wen-Chang Yuan, Taipei, Taiwan

[73] Assignee: Union Plastic Products Ltd., Taipei, Taiwan

[21] Appl. No.: 59,078

[22] Filed: Apr. 9, 1998

[51] Int. Cl.⁶ ...................................... F16K 51/00
[52] U.S. Cl. ........................... 137/316; 137/223; 251/90
[58] Field of Search .................................. 137/316, 223; 251/89, 90

[56] References Cited

U.S. PATENT DOCUMENTS 2,749,931  6/1956  Battin ........................................ 137/316

FOREIGN PATENT DOCUMENTS 1155836  6/1969  United Kingdom ................... 137/316

*Primary Examiner*—John Rivell
*Assistant Examiner*—Meredith Schoenfeld
*Attorney, Agent, or Firm*—Baker & Botts, L.L.P.

[57] ABSTRACT

A device capable of preventing deformation of an inflating valve on an inflatable article, includes a solid plug member for press-fitting into an air inlet of the inflating valve, a protective ring to be sleeved on a flexible plug unit of the inflating valve, and a connecting section which is disposed between the solid plug member and the protective ring. The connecting section has a length sufficient to straighten a connecting portion of the inflating valve between a flexible valve body and the flexible plug unit once the solid plug member is press-fitted into the air inlet and the protective ring is sleeved on the flexible plug unit.

2 Claims, 3 Drawing Sheets

DEVICE FOR PREVENTING DEFORMATION OF AN INFLATING VALVE DISPOSED ON AN INFLATABLE ARTICLE

BACKGROUND OF THE INVENTION

1. Field of the Invention

The invention relates to a deformation preventing device, more particularly to a device for preventing deformation of an inflating valve disposed on an inflatable article.

2. Description of the Related Art

Referring to FIGS. 1 and 2, an inflating valve 20 includes a flexible valve body 21 that is integrally formed with an inflatable article 10 and that defines an air inlet 22 in fluid communication with an interior of the inflatable article 10, a flexible plug unit 24 for plugging into the air inlet 22 so as to prevent the escape of air from the inflatable article 10, and a connecting portion 23 interposed between the flexible plug unit 24 and the valve body 21.

Since the inflatable article 10 is bulky in dimension when inflated, the inflatable article 10 is generally deflated so that a plurality of inflatable articles 10 can be stacked one over the other to facilitate storage and transport. As such, the inflating valves 20 are compressed due to stacking of the inflatable articles 10 so as to result in undesired deformation of the valve bodies 21 as well as the plug units 24.

SUMMARY OF THE INVENTION

Therefore, the object of this invention is to provide a device for preventing deformation of an inflating valve disposed on an inflatable article so as to retain the initial shape of the inflating valve.

Accordingly, the device of this invention is capable of preventing deformation of an inflating valve disposed on an inflatable article. The inflating valve includes a flexible valve body that is integrally formed with the inflatable article and that defines an air inlet in fluid communication with an interior of the inflatable article, a flexible plug unit for plugging into the air inlet, and a connecting portion interposed between the flexible valve body and the flexible plug unit. The deformation preventing device is a one-piece member made of a material more rigid than that of the inflating valve, and includes a solid plug member for press-fitting into the air inlet and having a length sufficient to prevent deformation of the valve body, a protective ring for sleeving on the flexible plug unit, and a connecting section interposed between the solid plug member and the protective ring. The connecting section has a length sufficient to straighten the connecting portion once the solid plug member is press-fitted into the air inlet and the protective ring is sleeved on the flexible plug unit.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Note that the same numeral will be used to denote the same element throughout the specification.

Figure 1:
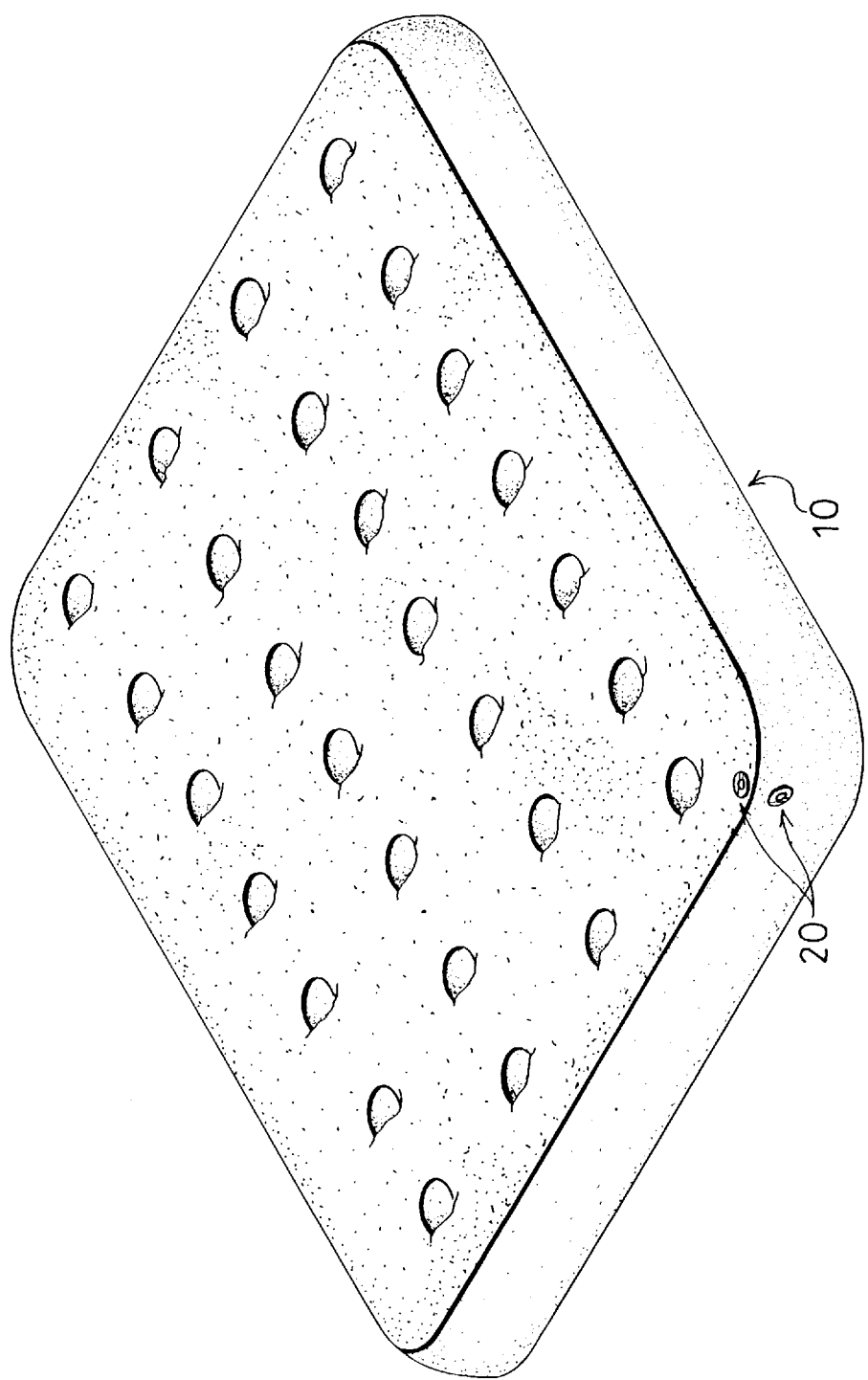
FIG. 1 is a perspective view of an inflatable article, wherein a conventional inflating valve is formed thereon.
Figure 2:
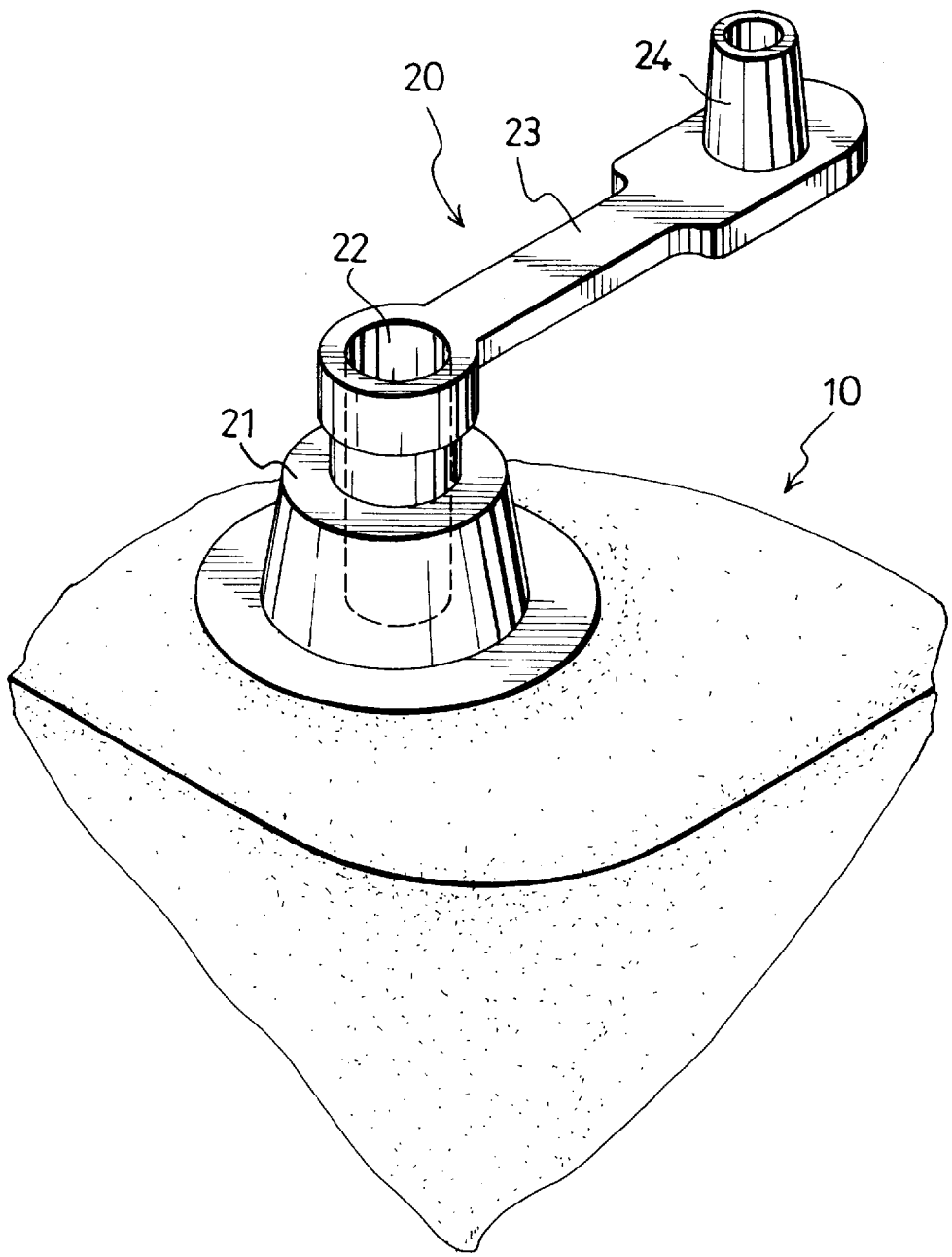
FIG. 2 is a partial view of the inflatable article, illustrating the conventional inflating valve in greater detail.
Figure 3:
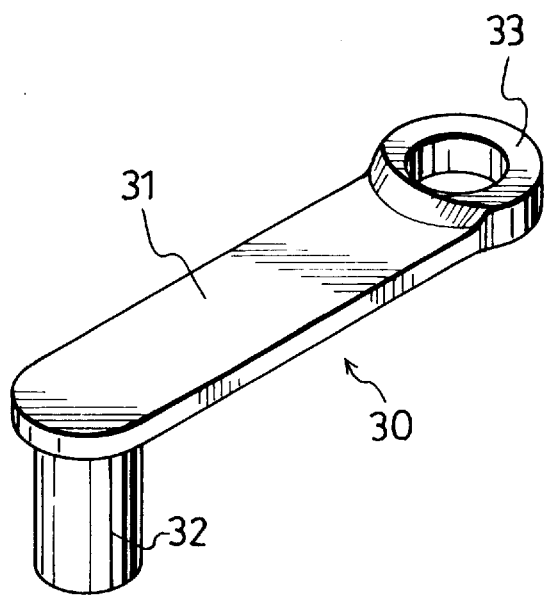
FIG. 3 is a perspective view of the preferred embodiment of a deformation preventing device of this invention.
Figure 4:
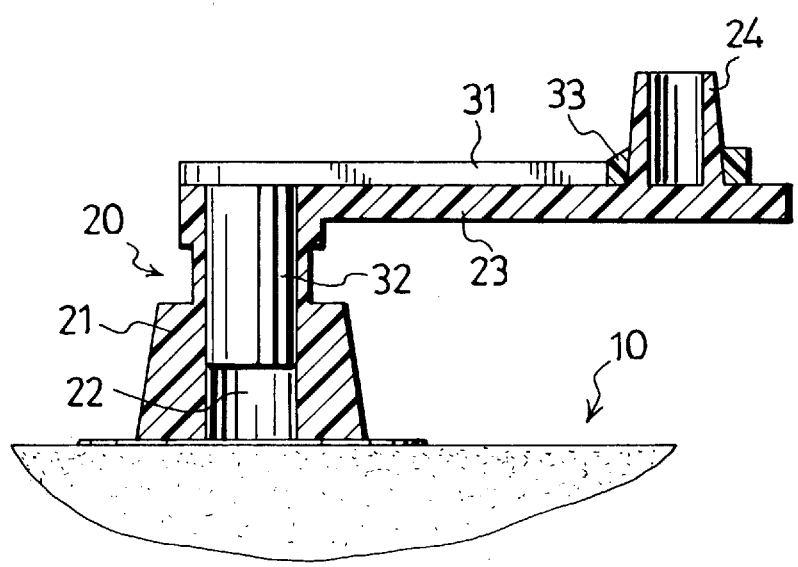
FIG. 4 illustrates how the deformation preventing device of the present invention is mounted on an inflatable article in order to prevent deformation of an inflating valve that is formed integrally with the inflatable article.

Referring to FIGS. 3 and 4, the preferred embodiment of a deformation preventing device of this invention is used for preventing deformation of an inflating valve 20 of an inflatable article 10.

As illustrated, the inflating valve 20 includes a flexible valve body 21 that is integrally formed with the inflatable article 10 and that defines an air inlet 22 in fluid communication with an interior of the inflatable article 10, a flexible plug unit 24 for plugging into the air inlet 22, and a connecting portion 23 interposed between the flexible valve body 21 and the flexible plug unit 24.

The deformation preventing device is a one-piece member made of a material more rigid than that of the inflating valve 20, and includes a solid plug member 32 adapted to be press-fitted into the air-inlet 22 and of a length sufficient to prevent deformation of the valve body 21, a protective ring 33 adapted to be sleeved on the flexible plug unit 24, and a connecting section 31 interposed between the solid plug member 32 and the protective ring 33. The connecting section 31 has a length sufficient to straighten the connecting portion 23 once the solid plug member 32 is press-fitted into the air inlet 22 and the protective ring 33 is sleeved on the flexible plug unit 24.

The material for constructing the preferred embodiment can either be polyvinyl chloride or polyethylene. Alternatively, the material can be rubber that is more rigid than the inflating valve so that the device can prevent deformation of the inflating valve regardless of the weight that is applied on the latter.

With this invention thus explained, it is apparent that numerous modifications and variations can be made without departing from the scope and spirit of this invention. It is therefore intended that this invention be limited only as indicated in the appended claims.

I claim:

1. A device for preventing deformation of an inflating valve of an inflatable article, the inflating valve including a flexible valve body that is integrally formed with the inflatable article and that defines an air inlet in fluid communication with an interior of the inflatable article, a flexible plug unit for plugging into the air inlet, and a connecting portion interposed between the flexible valve body and the flexible plug unit, the deformation preventing device being a one-piece member made of a material more rigid than that of the inflating valve and comprising:

a solid plug member adapted to be press-fitted into the air inlet and having a length sufficient to prevent deformation of the valve body;

a protective ring adapted to be sleeved on the flexible plug unit; and a connecting section interposed between the solid plug member and the protective ring and having a length sufficient to straighten the connecting portion once the solid plug member is press-fitted into the air inlet and the protective ring is sleeved on the flexible plug unit.

2. The deformation preventing device as defined in claim 1, wherein the material is polyvinyl chloride.

* * * * *